(12) United States Patent
Ouyang

(10) Patent No.: US 10,572,454 B2
(45) Date of Patent: Feb. 25, 2020

(54) STORAGE METHOD AND APPARATUS FOR DISTRIBUTED FILE SYSTEM

(71) Applicant: ZTE Corporation, Shenzhen (CN)

(72) Inventor: Wei Ouyang, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 849 days.

(21) Appl. No.: 14/417,957

(22) PCT Filed: Jul. 22, 2013

(86) PCT No.: PCT/CN2013/079813
§ 371 (c)(1),
(2) Date: Jan. 28, 2015

(87) PCT Pub. No.: WO2013/178155
PCT Pub. Date: Dec. 5, 2013

(65) Prior Publication Data
US 2015/0169621 A1 Jun. 18, 2015

(30) Foreign Application Priority Data

Aug. 3, 2012 (CN) .......................... 2012 1 0275170

(51) Int. Cl.
*G06F 16/182* (2019.01)
(52) U.S. Cl.
CPC ................ *G06F 16/1827* (2019.01)
(58) Field of Classification Search
CPC ............. G06F 17/302; G06F 17/30194; G06F 16/182; G06F 16/1827; H04L 67/10; H04L 67/42
(Continued)

(56) References Cited

U.S. PATENT DOCUMENTS 5,313,631 A * 5/1994 Kao ...................... G06F 12/122
7,698,517 B2 * 4/2010 Tulyani .................. G06F 3/061
711/161
(Continued)

FOREIGN PATENT DOCUMENTS

CN 101582013 A 11/2009
CN 102411542 A 4/2012
(Continued)

OTHER PUBLICATIONS

International Search Report for corresponding application PCT/CN2013/079813 filed Jul. 22, 2013; dated Oct. 24, 2013.
(Continued)

*Primary Examiner* — James Trujillo
*Assistant Examiner* — Jessica N Le
(74) *Attorney, Agent, or Firm* — Cantor Colburn LLP

(57) ABSTRACT

Provided are a storage method and apparatus for a distributed file system. The method includes: determining access times to a same file in preset time; and migrating the file to a storage device with higher performance than that of a current storage device according to the access times. Through the technical solution, tiered storage is performed on files in the distributed file system according to access enthusiasm of the files, that is, a file with a high access frequency in the preset time is migrated to a storage device with higher performance, and a file fragment storage location is associated with file fragment access enthusiasm through differential storage, so that IOPS pressure between storage devices is balanced and the overall performance is improved.

7 Claims, 4 Drawing Sheets

(58) Field of Classification Search
USPC .......................................................... 707/827
See application file for complete search history.

(56) References Cited

U.S. PATENT DOCUMENTS

| | | | | |
|---|---|---|---|---|
| 8,688,904 B1* | 4/2014 | Ari | ........................ | G06F 3/0611 |
| | | | | 711/100 |
| 2004/0210583 A1* | 10/2004 | Enko | ........................ | G06F 16/10 |
| 2007/0078972 A1* | 4/2007 | Yagishita | .............. | G06F 3/0605 |
| | | | | 709/224 |
| 2007/0083482 A1* | 4/2007 | Rathi | ....................... | G06F 3/048 |
| 2010/0005261 A1* | 1/2010 | Shiga | .................... | G06F 1/3268 |
| | | | | 711/162 |
| 2010/0274826 A1* | 10/2010 | Takata | .................. | G06F 3/0605 |
| | | | | 707/812 |
| 2011/0252214 A1* | 10/2011 | Naganuma | ............ | G06F 3/0607 |
| | | | | 711/170 |
| 2012/0054248 A1 | 3/2012 | Mehrotra et al. | | |
| 2012/0101995 A1* | 4/2012 | Agetsuma | ............. | G06F 3/0605 |
| | | | | 707/644 |
| 2012/0203809 A1 | 8/2012 | Kim | | |
| 2013/0080727 A1* | 3/2013 | Naito | ....................... | G06F 3/061 |
| | | | | 711/165 |
| 2014/0032837 A1* | 1/2014 | Nagasaki | ............... | G06F 3/0605 |
| | | | | 711/114 |

FOREIGN PATENT DOCUMENTS

| | | |
|---|---|---|
| CN | 102841931 A | 12/2012 |
| WO | 2011055976 A2 | 5/2011 |

OTHER PUBLICATIONS

European Search Report for corresponding application EP13797773; Report dated Dec. 23, 2015.

* cited by examiner

STORAGE METHOD AND APPARATUS FOR DISTRIBUTED FILE SYSTEM

TECHNICAL FIELD

The disclosure relates to the field of communications, and in particular to a storage method and apparatus for a distributed file system (DFS for short).

BACKGROUND ART

Distributed storage achieves mass storage and rapid deployment of data by saving data in a plurality of disks of a plurality of servers in a distributed manner. With the update of types of storage devices, new storage devices will continuously join the disk cluster; as a result, distributed storage must support plug-and-play for these storage devices.

Different storage devices have different capacities and performances from each other. How to utilize the space and performance of these storage devices to a maximum degree is a problem needing emphasized concern. Original disk reading and writing strategies mainly concern the space balancing between a disk and a file access server, or use a random polling and selection strategy. Other load balancing technologies in the relevant art mainly concern the selection of a file access server when writing a file according to load information about file access servers at the time when writing the file.

However, the load balancing strategies in the relevant art do not solve the problem of the load brought to the disk by high-frequency access to a hot file when reading out a file, and the system has the following defect: input/output operation per second (IOPS for short) which can be supported by different storage devices are different. At first, fragments for storing a file are selected according to a disk space balancing strategy or random strategy. Under a same load, a high performance storage device can operate stably, but a reading delay phenomenon may occur on a low performance storage device.

In the condition where high and low performance storage devices coexist, the low performance storage device will become a short slab of the performance of all distributed storage devices, and this will be presented more apparently when performing a file reading operation. Just because of the short slab effect of the low performance storage device, the performance difference between different storage devices will lower the overall performance of a disk cluster, resulting in that the performance of the high performance storage device cannot be used maximally.

SUMMARY

The embodiments of the disclosure provide a storage method and apparatus for a distributed file system, so as to at least solve the problem of the load brought to the disk by high-frequency access to a hot file when reading out a file in the relevant art.

According to one embodiment of the disclosure, a storage method for a distributed file system is provided, including: determining access times to a same file in preset time; and migrating the file to a storage device with higher performance than that of a current storage device according to the access times.

In the described embodiment, migrating the file to the storage device with higher performance than that of the current storage device according to the access times includes: determining that the access times exceed a preset threshold value; determining, from all storage devices, a storage device with higher performance than that of the current storage device and having an idle block; and migrating the file to the determined storage device.

In the described embodiment, after determining that the access times exceed the preset threshold value, the method further includes: setting an access enthusiasm attribute of the file as hot.

In the described embodiment, before determining the access times to a same file in preset time, the method further includes: respectively determining an input/output operation per second (IOPS) limit and a current IOPS of each storage device in the distributed file system; respectively calculating a ratio of the current IOPS to the IOPS limit of each storage device; and respectively comparing the ratio with a preset critical value; and if the ratio is greater than the preset critical value, determining that it is needed to migrate the file with higher access times than a preset threshold value in a current storage device.

In the described embodiment, after determining that it is needed to migrate the file with higher access times than the preset threshold value in the current storage device, the method further includes: receiving a reading request for the file, and adding one to the access times to the file.

In the described embodiment, before determining the access times to a same file in preset time, the method further includes: a file access server calculating an IOPS of a storage device corresponding to the file access server; and the file access server reporting the IOPS to a metadata server according to a predetermined period.

In the described embodiment, after migrating the file to the storage device with higher performance than that of the current storage device according to the access times, the method further includes: checking whether a ratio of a current IOPS to an IOPS limit of each storage device is not greater than a critical value according to a predetermined period; if the ratio value is not greater than the critical value, stopping migrating the file in the current storage device; and if the ratio is greater than the critical value, continuing migrating the file with higher access times than a preset threshold value in the current storage device.

According to another embodiment of the disclosure, a storage apparatus for a distributed file system is provided, wherein the storage apparatus is applied to a metadata server and includes: a first determination component, configured to determine access times to a same file in preset time; and a migration component, configured to migrate the file to a storage device with higher performance than that of a current storage device according to the access times.

In the described embodiment, the migration component includes: a first determination unit, configured to determine that the access times exceed a preset threshold value; a second determination unit, configured to determine, from all storage devices, a storage device with higher performance than that of the current storage device and having an idle block; and a migration unit, configured to migrate the file to the determined storage device.

In the described embodiment, the apparatus further includes: a second determination component, configured to respectively determine an input/output operation per second (IOPS) limit and a current IOPS of each storage device; a calculation component, configured to respectively calculate a ratio of the current IOPS to the IOPS limit of each storage device; a comparison component, configured to respectively compare the ratio with a preset critical value; and a third determination component, configured to, if the ratio is greater than the preset critical value, determine that it is needed to migrate the file with higher access times than a preset threshold value in a current storage device.

Through the embodiments of the disclosure, tiered storage is performed on files in the distributed file system according to access enthusiasm of the files, that is, a file with a high access frequency in the preset time is migrated to a storage device with higher performance, and a file fragment storage location is associated with file fragment access enthusiasm through differential storage, so that IOPS pressure between storage devices is balanced and the overall performance is improved.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the accompanying drawings.

DETAILED DESCRIPTION OF THE EMBODIMENTS

It should be noted that the embodiments and the characteristics of the embodiments can be combined with each other if no conflict is caused. The disclosure will be explained below with reference to the drawings and in conjunction with the embodiments in detail.

Figure 1:
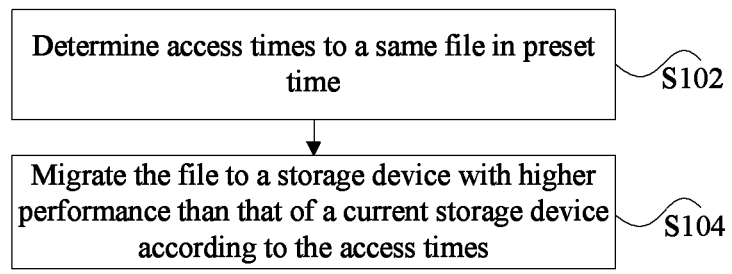
FIG. 1 is a flowchart of a storage method for a distributed file system according to an embodiment of the disclosure.

The embodiments of the disclosure provide a storage method for a distributed file system. FIG. 1 is a flowchart of a storage method for a distributed file system according to an embodiment of the disclosure. As shown in FIG. 1, the following step S102 to step S104 are included.

Step S102, access times to a same file in preset time are determined.

Step S104, the file is migrated to a storage device with higher performance than that of a current storage device according to the access times.

In the relevant art, the problem of the load brought to the disk by high-frequency access to a hot file when reading out a file is not solved. In the embodiments of the disclosure, tiered storage is performed on files in the distributed file system according to access enthusiasm of the files, that is, a file with a high access frequency in the preset time is migrated to a storage device with higher performance, and a file fragment storage location is associated with file fragment access enthusiasm through differential storage, so that IOPS pressure between storage devices is balanced and the overall performance is improved.

It should be noted that a file with a low access frequency may also be migrated to a storage device with low performance in preset time, so as to avoid the occupation of too much storage space of the storage device with high performance.

Step S104 includes: determining that the access times exceed a preset threshold value; determining from all the storage devices a storage device with higher performance than that of a current storage device and having an idle block; and migrating the file to the determined storage device with higher performance. In the present example embodiment, in the case where the access times exceed a preset threshold value, determining a storage device which may store the file, and performing migration when the determined storage device has an idle block can ensure the accuracy of file migration, avoiding the case where the storage device does not have any idle block but the file is migrated to the storage device, which may result in file loss.

In an example embodiment, after determining that the access times exceed a preset threshold value, an access enthusiasm attribute of the file may be set as hot. The access enthusiasm of a file is displayed in the manner of an attribute so as to facilitate user checking.

In another example embodiment, before determining access times to a same file in preset time, whether the current storage device needs file migration is confirmed, i.e. whether the load of the current storage device has exceeded a critical value (or referred to as a warning value) is determined, which can be achieved by the following operations: respectively determining an IOPS limit and a current IOPS of each storage device in the distributed file system; respectively calculating a ratio of the current IOPS to the IOPS limit of each storage device; respectively comparing the ratio with a preset critical value; and if the ratio is greater than the preset critical value, determining that it is needed to migrate the file with higher access times than a preset threshold value in a current storage device. In the present example embodiment, whether to perform migration is determined according to not only the load condition of the current storage device but also the access enthusiasm of the file in the device. The time and frequency of a user to access a file are both random. Unreasonable file migration may lower the usage efficiency of the storage device, and quicken the loss degree of the storage device.

The above-mentioned process of determining whether it is needed to migrate the file according to the load of the storage device is also a condition for initiating a tiered storage flow (which may be referred to as a critical value algorithm). There are mainly two factors which affect initiating migration: (1) whether the IOPS of the storage device reaches a designated warning value, after the IOPS approaches the critical value, the processing speed of the storage device will be decreased significantly, and tired storage must be initiated; and (2) whether the system has sufficient idle high performance storage fragment available, if not, the tiered storage flow is ignored.

In practical applications, whether tiered storage needs to be initiated is determined according to the file access enthusiasm, the IOPS limit and the current IOPS statistical value of each storage device (for example, a disk) and the idle block condition of the storage device. For example, assuming that the identification of whether to initiate tiered storage is y; the IOPS limit of a disk i is $IOPS_i$; the current IOPS statistical value of the disk i is $CIOPS_i$; and the identification of whether there are sufficient idle blocks is f, only when a file is a hot file and the ratio value of $CIOPS_i/IOPS_i$ is greater than a critical value a, and a target storage device has sufficient idle blocks, will the tiered storage flow be initiated.

In an example embodiment, after determining that it is needed to migrate the file with higher access times than a preset threshold value in a current storage device, the above-mentioned method further includes: receiving a reading request for the file, and adding one to the access times to the file. In the present example embodiment, in the case of determining that it is needed to perform file migration according to the load condition of the current storage device, receiving a reading request for a file of the current storage device and calculating access times to the file may avoid performing statistics on the access enthusiasm of a file in each storage device to some extent which increases the burden for a metadata server. In practical applications, a tiered storage switch is provided in the metadata server, and the switch is turned on after determining that it is needed to perform migration, and then the statistics on access times is performed.

In an example embodiment, in the above-mentioned process of determining whether it is needed to perform migration according to the load of a storage device, an IOPS of the storage device is used. The IOPS may be obtained according to the following method: a file access server calculating an IOPS of a storage device corresponding to the file access server; and the file access server reporting the IOPS to a metadata server according to a predetermined period.

In practical applications, a storage device IOPS checking timer is provided in a service program of the file access server. Once the timer is turned on, the timer invokes an operating system interface to calculate an IOPS parameter of each storage device (for example, a disk) in the present file access server, and the file access server uses the timer to report the IOPS of each disk at regular time intervals to a metadata server.

After step S104, it can be determined whether the load of the original storage device of the file has recovered to a value less than the critical value after the file is migrated. If not, the access enthusiasm of a file therein is continued to be monitored, and the file is migrated when a condition is met. This may be achieved according to the following steps: checking whether a ratio of a current IOPS to an IOPS limit of each storage device is not greater than a critical value according to a predetermined period; if the ratio value is not greater than the critical value, stopping migrating the file in a current storage device; and if the ratio is greater than the critical value, continuing migrating a file with higher access times than a preset threshold value in the current storage device.

The above-mentioned storage method for a distributed file system optimizes the implementation solution of distributed file system storage in the related art, and can be understood as tiered file fragment storage. The tiered storage refers to storing a file with a high access frequency in a storage device with high performance, that is, the storage devices are divided into two tiers: storage devices with low performance and storage devices with high performance. By means of the above-mentioned solution, IOPS pressure between storage devices is balanced, and the overall performance is improved, thereby achieving the maximum usage of the compatibility and performance of storage devices with different performances.

In order to make the technical solutions and implementation methods of the embodiments of the disclosure more apparent, the implementation process is described in details in combination with example embodiments below.

Figure 2:
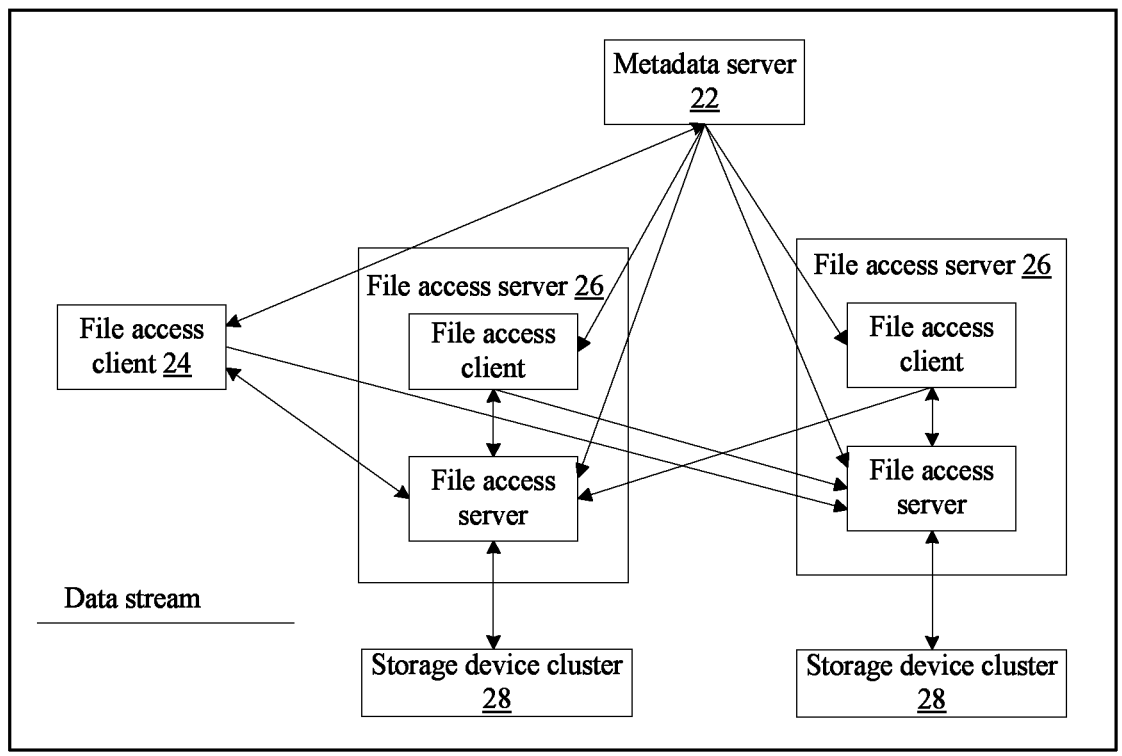
FIG. 2 is a system architecture diagram of a storage method for a distributed file system according to an embodiment of the disclosure.

The system architecture for achieving the above-mentioned solution includes a metadata server 22, a file access client 24, a file access server 26 and a storage device cluster 28, as shown in FIG. 2, these components will be described respectively hereinafter.

The metadata server 22 is responsible for managing metadata information about all files in the current distributed file system, such as file names, data blocks, and providing operations such as metadata writing in and query for the file access client 24. The embodiments of the disclosure adds an access pressure weight value (i.e. access times in preset time) on the basis of a metadata file list, and when the weight value of the file exceeds a configured threshold value, all the fragments of the file stored in low performance storage areas are migrated to high performance storage areas, without affecting the access of the current user.

The file access client 24 is responsible for providing an interface invoking service similar to a standard file system for the current distributed file system oriented application program; initiating an access request, acquiring data and then returning same to the application program; and migrating, when the metadata server 22 initiates a migration request, file fragments to other file access servers according to a fragment list in the request.

The file access server 26 is responsible for interacting with the storage device cluster 28 in the current distributed file system, and performing practical reading and writing operations on data blocks; in response to a data reading or writing request of the file access client 24, reading data from the storage device cluster 28 and returning same to the file access client 24, or reading data from the file access client 24 and writing same in the storage device cluster 28. The file access server 26 as shown in FIG. 2 includes a file access server and a file access client.

The storage device cluster 28 may be storage device such as a low performance integrated drive electronics (IDE for short) disk or a serial advanced technology attachment (SATA for short) disk, a high performance solid state disk (SSD for short), a serial attached SCSI (SAS for short, wherein the SCSI is short for a small computer system interface), and an SATA.

Figure 3:
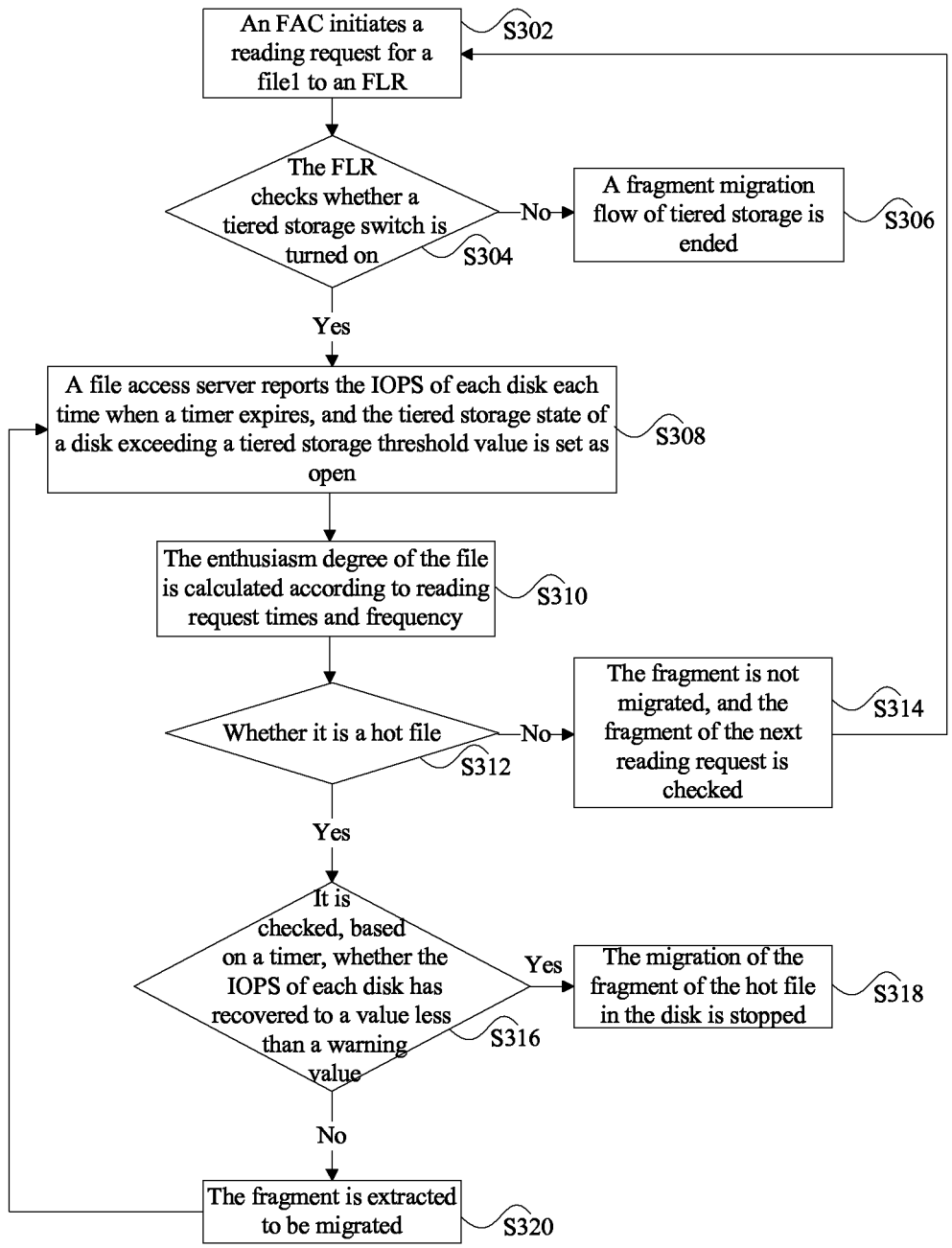
FIG. 3 is a flowchart of a storage method for a distributed file system according to an example embodiment of the disclosure.

FIG. 3 is a flowchart of a storage method for a distributed file system according to an example embodiment of the disclosure. As shown in FIG. 3, the following steps are included:

Step S302, a file access client (FAC for short) initiates a reading request for a file 1 to a file location register (FLR for short).

Step S304, the FLR checks whether a tiered storage switch is turned on. If so, step S308 is executed; otherwise, step S306 is executed.

Step S306, a fragment migration flow of tiered storage is ended.

Step S308, a file access server reports the IOPS of each disk each time when a timer expires, and the tiered storage state of a disk exceeding a tiered storage threshold value is set as open.

Step S310, the enthusiasm degree of the file is calculated according to reading request times and frequency.

Step S312, whether it is a hot file is judged. If so, step S316 is executed; otherwise, step S314 is executed.

Step S314, the fragment is not migrated, and the fragment of the next reading request is checked.

Step S316, it is checked, based on a timer, whether the IOPS of each disk has recovered to a value less than a warning value. If so, step S318 is executed; otherwise, step S320 is executed.

Step S318, the migration of the fragment of the hot file in the disk is stopped.

Step S320, the fragment is extracted to be migrated.

It should be noted that, compared to the normal fragment migration flow used for disk space balancing, the tiered storage initiated due to a high access enthusiasm operates at a higher priority so as to ensure the fluency for a user to access a file.

In another example embodiment, the steps are as follows:

Step 1, observing an IOPS load of a disk on a network management interface and recording an initial value;

step 2, turning on a tiered storage switch on the network management interface and parameters coming into effect immediately;

step 3, configuring a disk IOPS threshold value on the network management interface and parameters coming into effect immediately;

step 4, checking whether hot file migration has started and when the migration will end in a log; and step 5, after the migration ends, observing the IOPS load of the disk on the network management interface, comparing the previous load exceeding a critical value with a load after migration, if the IOPS load after the migration decreases to a value less than the critical value, which shows that the setting of the threshold value is relatively reasonable, and if the IOPS load after the migration is still above the critical value, repeating step 3 and decreasing the IOPS threshold value.

It should be noted that the steps shown in the flowchart of the drawings can be executed, for example, in a computer system with a set of instructions executable by a computer, in addition, a logic order is shown in the flowchart, but the shown or described steps can be executed in a different order under some conditions.

Figure 4:
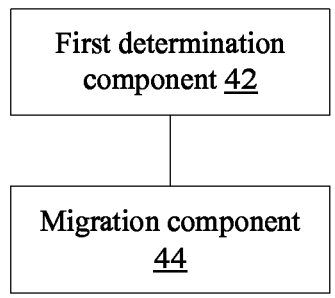
FIG. 4 is a structural block diagram of a storage apparatus for a distributed file system according to an embodiment of the disclosure.

The embodiments of the disclosure also provide a storage apparatus for a distributed file system, applied to a metadata server, and the storage apparatus for a distributed file system may be used for achieving the above-mentioned storage method for a distributed file system. FIG. 4 is a structural block diagram of a storage apparatus for a distributed file system according to an embodiment of the disclosure. As shown in FIG. 4, the apparatus includes a first determination component 42 and a migration component 44. The structure will be described below in details.

The first determination component 42 is configured to determine access times to a same file in preset time; and the migration component 44 is coupled to the first determination component 42 and is configured to migrate the file to a storage device with higher performance than that of a current storage device according to the access times determined by the first determination component 42.

In the relevant art, the problem of the load brought to the disk by high-frequency access to a hot file when reading out a file is not solved. In the embodiments of the disclosure, tiered storage is performed on files in the distributed file system according to access enthusiasm of the files, that is, a file with a high access frequency in the preset time is migrated to a storage device with high performance, and a file fragment storage location is associated with file fragment access enthusiasm through differential storage, so that IOPS pressure between storage devices is balanced and the overall performance is improved.

Figure 5:
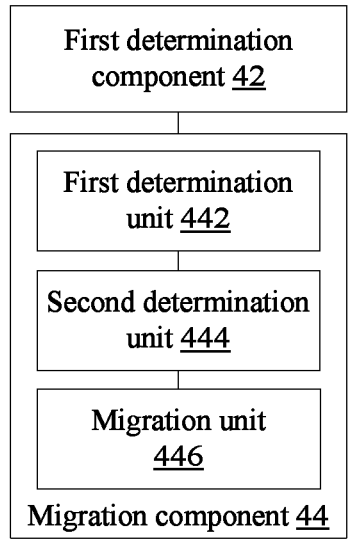
FIG. 5 is a structural block diagram I of a storage apparatus for a distributed file system according to an example embodiment of the disclosure.

As shown in FIG. 5, the migration component 44 includes: a first determination unit 442, configured to determine that the access times exceed a preset threshold value; a second determination unit 444, coupled to the first determination unit 442, and configured to determine, from all storage devices, a storage device with higher performance than that of the current storage device and having an idle block; and a migration unit 446, coupled to the second determination unit 444, and configured to migrate the file to the storage device determined by the second determination unit 444.

In an example embodiment, the migration component 44 further includes: a setting unit, coupled to the first determination unit 442, and configured to set an access enthusiasm attribute of the file as hot.

Figure 6:
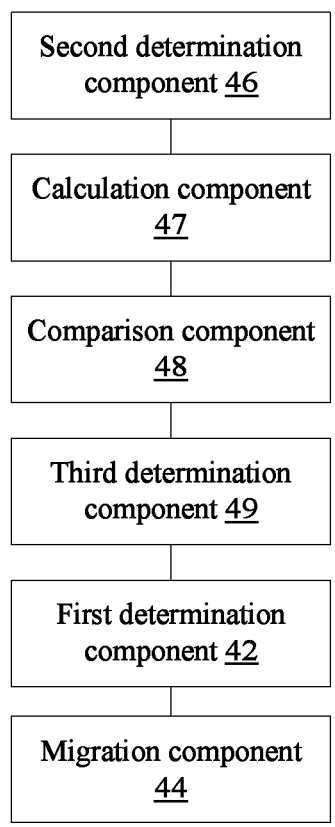
FIG. 6 is a structural block diagram II of a storage apparatus for a distributed file system according to an example embodiment of the disclosure.

As shown in FIG. 6, the above-mentioned apparatus further includes: a second determination component 46, configured to respectively determine an IOPS limit and a current IOPS of each storage device; a calculation component 47, coupled to the second determination component 46, and configured to respectively calculate a ratio of the current IOPS to the IOPS limit of each storage device; a comparison component 48, coupled to the calculation component 47, and configured to respectively compare the ratio with a preset critical value; and a third determination component 49, coupled to the comparison component 48, and configured to, if the ratio is greater than the preset critical value, determine that it is needed to migrate the file with higher access times than a preset threshold value in a current storage device.

In an example embodiment, the above-mentioned apparatus further includes: a receiving component, coupled to the third determination component 49, and configured to receive a reading request for the file, and add one to the access times to the file.

In an example embodiment, the above-mentioned apparatus further includes: a checking component, configured to check whether a ratio of a current IOPS to an IOPS limit of each storage device is not greater than a critical value according to a predetermined period; a first processing component, coupled to the checking component, and configured to, if the ratio value is not greater than the critical value, stop migrating the file in a current storage device; and a second processing component, coupled to the checking component, and configured to, if the ratio is greater than the critical value, continue migrating the file with higher access times than a preset threshold value in the current storage device.

It should be noted that the storage apparatus for a distributed file system described in the apparatus embodiments corresponds to the above-mentioned method embodiments, with the specific implementation being described in the method embodiment in detail, thereby needing no further description.

It should be noted that the above-mentioned solution may be applied to a distributed file system having a metadata server, but may not be applied to a general storage system.

In conclusion, according to the embodiments above of the disclosure, a storage method and apparatus for a distributed file system are provided. In the disclosure, tiered storage is performed on files in the distributed file system according to access enthusiasm of the files, that is, a file with a high access frequency in the preset time is migrated to a storage device with high performance, and a file fragment storage location is associated with file fragment access enthusiasm through differential storage, so that IOPS pressure between storage devices is balanced and the overall performance is improved. The maximum usage of the compatibility and performance of storage devices with different performances are achieved. By means of migrating a file with a high enthusiasm degree to a storage device with higher performance, the short slab problem of the storage method in a hybrid storage device environment in the related art is significantly released, and load balancing between different storage devices is achieved, thereby improving the overall performance of storage devices in a heterogeneous storage mode.

Obviously, those skilled in the art shall understand that the above-mentioned components and steps of the disclosure can be realized by using general purpose calculating device, can be integrated in one calculating device or distributed on a network which consists of a plurality of calculating devices. Alternatively, the components and the steps of the disclosure can be realized by using the executable program code of the calculating device. Consequently, they can be stored in the storing device and executed by the calculating device, or they are made into integrated circuit component respectively, or a plurality of components or steps thereof are made into one integrated circuit component. In this way, the disclosure is not restricted to any particular hardware and software combination.

The above description is only example embodiments of the disclosure and is not intended to limit the disclosure, and the disclosure can have a variety of changes and modifications for those skilled in the art. Any modification, equivalent replacement, or improvement made within the principle of the disclosure shall all fall within the protection scope as defined by the appended claims of the disclosure.

What is claimed is:

1. A storage method for a distributed file system, the method comprising:
   determining access times to a same file in preset time; and
   migrating the file to a storage device with higher performance than that of a current storage device according to the access times;
   wherein migrating the file to the storage device with higher performance than that of the current storage device according to the access times comprises:
      determining that the access times exceed a preset threshold value;
      determining, from all storage devices, a storage device with higher performance than that of the current storage device and having an idle block; and migrating the file to the determined storage device;
   wherein before determining the access times to a same file in preset time, the method further comprises:
      respectively determining an input/output operation per second (IOPS) limit and a current IOPS of each storage device in the distributed file system; respectively calculating a ratio of the current IOPS to the IOPS limit of each storage device; and respectively comparing the ratio with a preset critical value; and if the ratio is greater than the preset critical value, determining that it is needed to migrate the file with higher access times than a preset threshold value in a current storage device;
   wherein after migrating the file to the storage device with higher performance than that of the current storage device according to the access times, the method further comprises:
      checking whether a ratio of a current IOPS to an IOPS limit of each storage device is not greater than a critical value according to a predetermined period;
      if the ratio value is not greater than the critical value, stopping migrating the file in the current storage device; and
      if the ratio is greater than the critical value, continuing migrating the file with higher access times than a preset threshold value in the current storage device.

2. The method according to claim 1, wherein after determining that the access times exceed the preset threshold value, the method further comprises:
   setting an access enthusiasm attribute of the file as hot.

3. The method according to claim 1, wherein after determining that it is needed to migrate the file with higher access times than the preset threshold value in the current storage device, the method further comprises:
   receiving a reading request for the file, and adding one to the access times to the file.

4. The method according to claim 1, wherein before determining the access times to a same file in preset time, the method further comprises:
   a file access server calculating an IOPS of a storage device corresponding to the file access server; and
   the file access server reporting the IOPS to a metadata server according to a predetermined period.

5. A storage apparatus for a distributed file system, wherein the storage apparatus is applied to a metadata server and comprises a hardware processor, configured to perform programming components stored in a memory, wherein the programming components comprise:
   a first determination component, configured to determine access times to a same file in preset time; and
   a migration component, configured to migrate the file to a storage device with higher performance than that of a current storage device according to the access times;
   wherein the migration component comprises:
      a first determination unit, configured to determine that the access times exceed a preset threshold value;
      a second determination unit, configured to determine, from all storage devices, a storage device with higher performance than that of the current storage device and having an idle block; and a migration unit, configured to migrate the file to the determined storage device;
   wherein the programming components further comprise:
      a second determination component, configured to respectively determine an input/output operation per second (IOPS) limit and a current IOPS of each storage device; a calculation component, configured to respectively calculate a ratio of the current IOPS to the IOPS limit of each storage device; a comparison component, configured to respectively compare the ratio with a preset critical value; and a third determination component, configured to, if the ratio is greater than the preset critical value, determine that it is needed to migrate the file with higher access times than a preset threshold value in a current storage device;
   the apparatus further comprising:
      a checking component configured to check whether a ratio of a current IOPS to an IOPS limit of each storage device is not greater than a critical value according to a predetermined period;
      a first processing component coupled to the checking component configured to, if the ratio value is not greater than the critical value, stop migrating the file in the current storage device; and
      a second processing component coupled to the checking component configured to, if the ratio is greater than the critical value, continue migrating the file with higher access times than a preset threshold value in the current storage device.

6. The apparatus according to claim 5, wherein the migration component further comprises:
   a setting unit, configured to set an access enthusiasm attribute of the file as hot.

7. The apparatus according to claim 5, wherein the programming components further comprises:
   a receiving component, configured to receive a reading request for the file, and add one to the access times to the file.

* * * * *